Dec. 9, 1969 M. N. FRISCH 3,483,506
VEHICLE LOCATION INDICATOR
Filed March 8, 1967 2 Sheets-Sheet 1
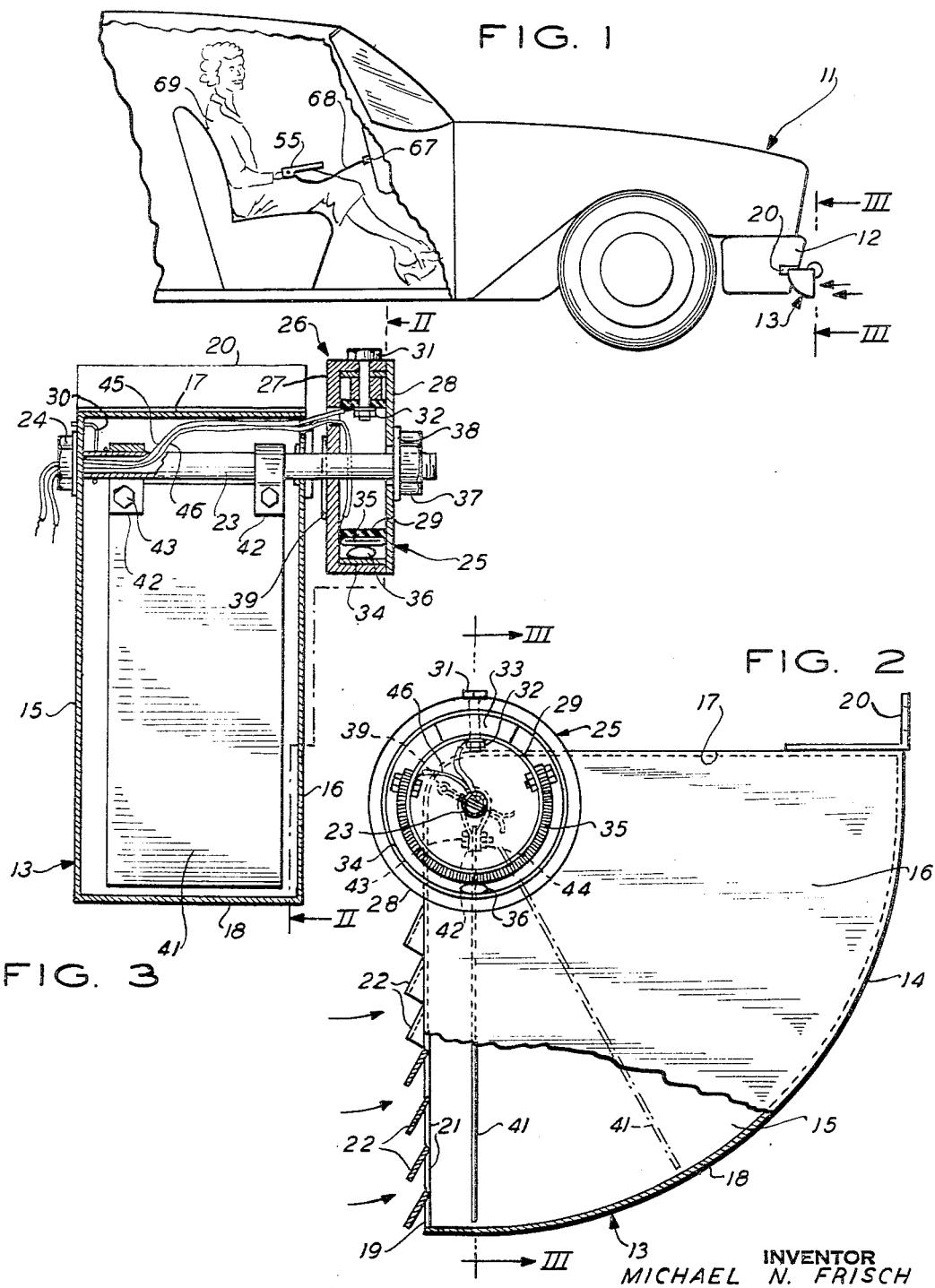
INVENTOR
MICHAEL N. FRISCH
BY Towson Price
ATTORNEY

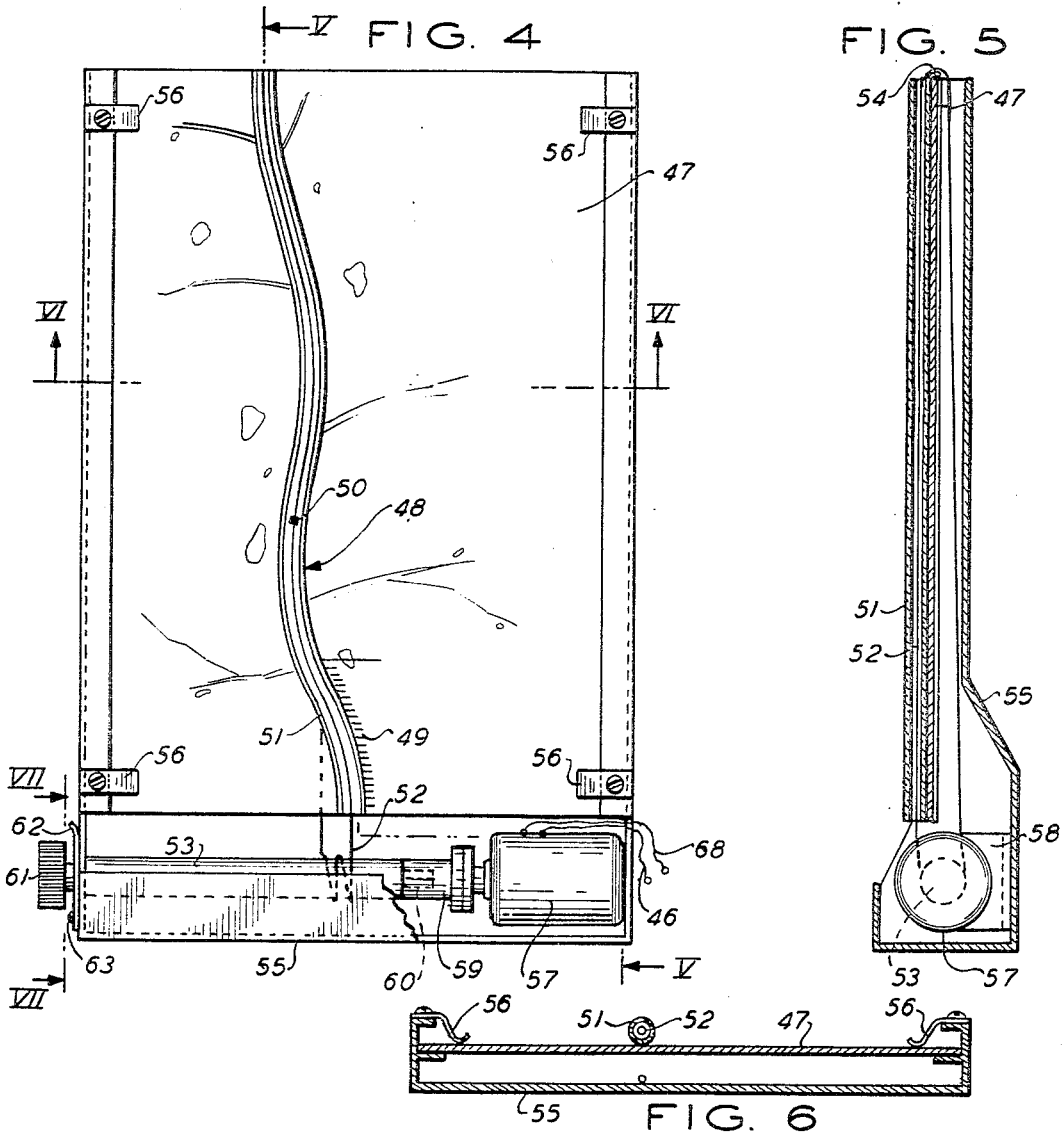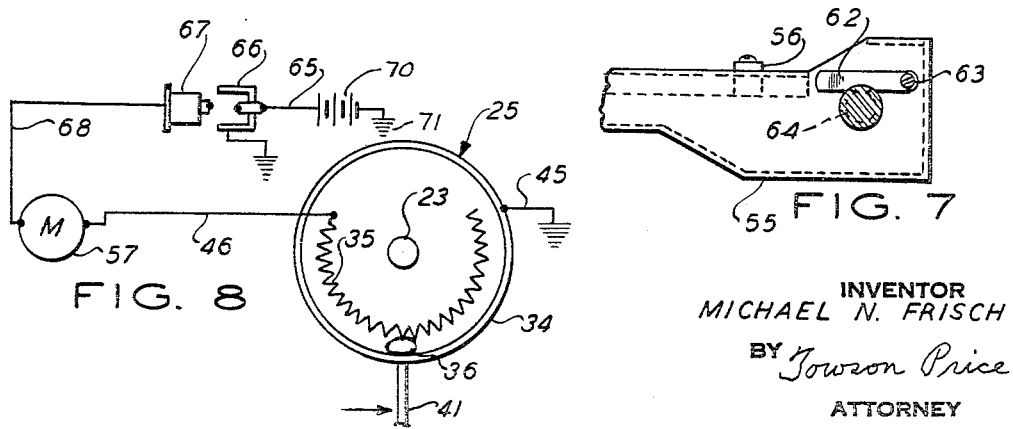

United States Patent Office 3,483,506
Patented Dec. 9, 1969

1

3,483,506
VEHICLE LOCATION INDICATOR
Michael N. Frisch, Maplewood, N.J.
(33 Glenbrook Road, New Providence, N.J. 07974)
Filed Mar. 8, 1967, Ser. No. 621,631
Int. Cl. G08g 1/12; G09f 9/00; G01c 21/00
U.S. Cl. 340—24                                    10 Claims

ABSTRACT OF THE DISCLOSURE

A fixed map with a transparent tubular guide representing the route to be followed by a vehicle, and an indicator cord advanced through said guide, to correspond with the travel and direction of the vehicle along the route, by a motor-driven shaft, the speed of which is controlled by means of air pressure responsive to the speed, but not connected to mechanism, of the vehicle.

BACKGROUND, OBJECTS AND BRIEF SUMMARY OF THE INVENTION

This invention relates to a direction and position indicator for a vehicle which may be one of the motorized type. Indicators of this type serve to point out on a map the geographical location of a vehicle on a route being traveled and the progress it is making. Indicators previously shown and described in patent literature are of either the semi-manually operated or the automatically operated type. The latter, which is preferable, generally comprises mechanism operated by the motor of the vehicle, if motorized, to work in unison with a slow moving map provided for indicating purposes. The map is caused to travel past a stationary pointer at a speed which is proportionate to that of the vehicle.

In providing and employing a movable and specially-prepared road map in an indicator of this type, certain difficulties and discrepancies arise. They do not alone affect the cost of operation, but also disclose certain defects in accurately and correctly indicating the vehicle's position. This is due to the pointer or arrow, designating or pointing in only a single, instead of one of several directions in accordance with the position of the vehicle.

The pointer, if connected to the vehicle speedometer or other part thereof which moves in accordance with the speed of the vehicle, therefore, indicates only different positions and not different directions of the vehicle. The inconvenience thus caused is that the driver will not readily discern, on the usually specially-prepared map, the angular or curved movements which the vehicle is bound to make during its travel.

As a brief summary, my invention is to provide an indicator especially for motor vehicles, including private passenger cars, buses, trucks, railway trains and ships, and driven by air pressure responsive to the speed of the vehicle which will on a map, not only identify the position of the vehicle but also the direction it is taking during its travel. This means that whereas in former indicators the identification of the vehicle's position was given only along a straight line or in one direction on the map, the present invention provides an indicating mechanism wherein the vehicle's travel in any direction is clearly shown and visible to an occupant or passenger of the vehicle.

2

Another object of my invention is to employ a road map purchaseable on the market and to a scale corresponding with the speed at which the position indicator is to be driven, and to insert the map or a part thereof into a suitable mounting or housing wherein it is visible in its entirety and easily replaceable by another map.

A further object is to maintain the road map stationary and have a pointer movable, under the control of a novel adjustable rheostat, to indicate both the position and direction of travel of a vehicle.

A still further object is to provide an improved rheostat.

Another object of this invention is to provide a mechanism that can be readily manipulated, regulated and adjusted while the vehicle is in motion.

These and other objects and advantages will become apparent from the following detailed description when taken with the accompanying drawings. It will be understood that the drawings are for purposes of illustration and do not define the scope or limits of the invention.

BRIEF DESCRIPTION OF THE DRAWING

In the drawings, wherein like reference characters denote like parts in the several views:

FIGURE 1 is a fragmentary side elevational view of a motor vehicle embodying my invention.

FIGURE 2 is a side elevational view of the control blade and electrical resistor assembly of an indicator embodying my invention, on the line II—II of FIGURE 3, in the direction of the arrows.

FIGURE 3 is a vertical sectional view of the blade and resistor assembly on the line III—III of FIGURES 1 and 2, in the direction of the arrows.

FIGURE 4 is a front elevational view of a map holder and indicator unit embodying my invention, with parts broken away.

FIGURE 5, is a sectional view of the unit on the line V—V of FIGURE 4, in the direction of the arrows.

FIGURE 6 is a transverse sectional view of the same unit on the line VI—VI of FIGURE 4, in the direction of the arrows.

FIGURE 7 is a fragmentary sectional view of the unit on the line VII—VII of FIGURE 4, in the direction of the arrows and to a larger scale.

FIGURE 8 is a wiring diagram.

DETAILED DESCRIPTION OF A PREFERRED EMBODIMENT

Referring to the drawings in detail, there is shown in FIGURE 1, a motor vehicle 11 on desirably the front bumper 12 of which is mounted a current-controlling device 13, viewed from the side opposite to that visible in FIGURE 2. The device 13, shown in detail in FIGURES 2 and 3 and diagrammatically in FIGURE 8, comprises a preferably generally sector-shaped frame or housing 14, which may be made of suitable sheet material including metal and plastic. The housing 14 comprises generally flat side walls 15 and 16 connected at their top edges by an upper wall 17, carrying a bracket 20 which may serve to attach the housing 14 to a selected part of the vehicle, such as a bumper, fender, frame or the like, and at their rear and bottom edges by an arcuate rear and bottom wall 18, desirably perforated for the passage of air therethrough.

The front wall 19 of the housing is here shown provided with a series of horizontally elongated openings 21 desirably louvered or protected from undesired wind and the entrance of rain and the like by forwardly and downwardly sloping wall portions 22.

The upper forward corner portions of the side walls 15 and 16 are apertured desirably on the axis of the arcuate rear and bottom wall 18 and receives a desirably hollow control-blade-supporting shaft 23. Said shaft 23 is held against undesired axial movement by suitable means here shown as a nut 24 at one end. The opposite end portion of the shaft 23 is here shown extended beyond the side wall 16 and the exterior portion carries thereon a variable resistor assembly or rheostat 25, comprising an insulative housing or enclosure 26 which may consist of an outwardly-opening plastic cup 27 closed by a circular plastic cover 28. A housing (not shown) desirably protects the entire device 13, including the resistor assembly 25, from the elements. The flange portion of the cup 27 carries an insulator ring or annulus 29 by suitable means, such as a bolt 31 and nut 32, which hold the ring 29 in place against a spacer 33. The inner concave surface of said flange portion is engaged by conductive material such as a metallic coating, lining or strip 34. The lining 34 may be formed as a planar strip bent to conform with the curvature of the engaged surface of the flange. The lining 34 is desirably of metal such as stainless or other steel not affected by metallic mercury and the bolt 31 also may hold it in place, as illustrated, with the spacer 33 between it and the ring 29. Mounted on the convex surface of the ring 29 is a resistor or resistance element which may be a thin coating of some high-resistance material applied like a paint. However, for simplicity it is here shown as evenly spaced turns of a resistance winding forming a rheostat or resistor 35, spaced radially from said lining 34, and between which is disposed a globule 36 of metallic mercury or other liquid conductive material. It is seen that resistance to turning is minimized by using the globule rather than a solid contact to engage the resistor material. In the conventional rheostat of this size, a sliding metal part on the resistance element provides only a single point of contact, and requires considerable force to overcome the sliding friction. In accordance with my invention, the conductive liquid 36 (say mercury) provides a minimum rolling friction, consequently minimizing friction of rheostat adjustment and assures a wide and more positive contact area between the resistance element 35 and the electrically conductive strip 34.

The assembly 25 is here shown as held in adjusted position on the exterior portion of the shaft 23 by a nut 37 and washer 38 threaded on the shaft end portion and holding the cover 28 against the flange of the cup 27 and the latter against a suitable stop, which may be a cotter pin 39. There is a control blade 41 non-turnably supported with respect to and by said shaft 23, as by means of clamps 42. The shaft passes through loops of said clamps which are tightened in place by suitable means here shown as bolts 43 and nuts 44. Electricity may be brought to the conductive lining 34 by means of a grounded lead 45 and the bolt 31 and from said lining through the conductive globule 36 and the rheostat material 35 by a lead 46 to only one end of the material of the resistor 35, leaving the other end portion insulated by the annulus 29.

A road or other map 47 on which the location of the vehicle 11 which carries the device 13 is to be shown is illustrated in FIGURES 4 to 7, inclusive. It is necessarily special, that is, it is drawn to a scale determined by the speed at which an indicator is to move therealong and a different map is required for every highway or other route traveled. The main highway or that being traveled by the vehicle is designated 48 and may have graduations 49 therealong representing units of distance, such as miles. A transparent tube 51 is secured to the map over or along said highway 48. A linear-form indicator or cord 52 is disposed in said tube 51, wound around a drive shaft 53 for it and continued behind the map to unite with the other end of the cord as at the top of the tube 51, over a curved or anti-friction portion on which it slides or moves as indicated at 54. The cord 52 carries a marked part or marker portion 50 which may be of a color, such as red, contrasting with that of the rest of the cord. The position of the marker portion along the map highway 48 thereof, as turned by the tube 51 while the cord is moved therealong, is to give the direction and indicate the location of the vehicle 11.

The map 47 is desirably held in place in a rigid housing 55, by suitable means such as spring clips 56. A drive motor 57 for said cord 52 is also carried in said housing 55 as by means of a bracket 58. The armature shaft of the motor 57 is connected to the cord drive shaft 53, as by means of an axially-separable coupling 59. The shaft 53 here has a non-circular end projection 60, desirably square in transverse section, which fits a mating socket in the adjacent end of the coupling 59, to allow for separation of the shaft from the motor 57. The left-hand end of the shaft 53, as viewed in FIGURE 4, carries a compensator knob 61 which is usable to manually turn the shaft 53 to initially and as desired set the marker 50 at the location on the map at which the vehicle is positioned, or for adjusting said clutch to couple or uncouple said shaft from the motor 57. Engagement of the projection 60 in the coupling socket 59 is maintained during operation by suitable means, such as a latch device 62 pivoted to the housing 55 at 63 and engageable in a peripheral groove 64 in the shaft 53 to prevent undesired axial movement thereof.

The resistor assembly 25 of the device 13 is connected to the drive motor 57 and a battery 70 of or carried on the vehicle as shown in FIGURE 8. The motor 57 receives power from one pole of the battery 70, the other pole of which is grounded at 71, through lead 65 to a power socket 66, which may be that for a cigarette lighter which has been removed. A power plug 67 has a center contact which may engage the center contact of the socket 66 and conduct current to the motor 57 through lead 68. The motor current then passes through lead 46 to rheostat 35, globule 36 and lining 34 to grounded lead 45. Of course, where my invention is used on buses, railway trains, ships and other vehicles where a cigarette lighter socket is not available to the viewer, some other battery must be used for power.

The operating of my indicator may be as follows. The control blade 41 which acts as a biasing weight is positioned with respect to the rhetostat 35 so that when said blade is vertical, as in full lines of FIGURE 2 and as in FIGURE 8, the motor 57 will not operate. This means that the resistance of the rheostat 35 beween the globule 36 and the end of said resistor 35 is then so high that not enough torque is developed in the motor armature to overcome friction. When the vehicle speeds up so that the control blade 41 is tilted by air pressure, from its normal vertical position which it tends to return to by gravity, supplemented if desired by a coiled return spring 30, to the inclined position shown in dot-dash lines to FIGURE 2, the resistor assembly 25 is turned counter-clockwise, causing the globule to engage the rheostat 35 nearer its connection with the motor 57 and consequently cutting out more and more resistance as the speed of the vehicle increases, to cause the motor 57 to rotate at a speed proportional to that of the vehicle.

During operation of the vehicle, the housing 55 is to be held in a position available to the driver, as by passenger 69. If on a public conveyance, such as a bus, train or ship, it would be mounted so as to be visible by the passengers. If after traveling a certain distance it is found that the indication is either too high or too low, an adjustment may be made by changing the at-rest position of the rheostat 35 and/or manually turning the shaft to cause the marker 50 to register where it should.

A rhetostat or other speed-changer (not shown) may be associated with the motor 57 in its circuit or otherwise, and independent of the rheostat 35 to adjust or calibrate the motor speed.

Having now described my invention in detail in accordance with the requirements of the patent statutes, those skilled in this art will have no difficulty in making changes or modifications in the individual parts or their relative assembly in order to meet specific requirements or conditions. Such changes and modifications may be made without departing from the scope and spirit of the invention

I claim:

1. A direction and position indicator for a vehicle comprising a stationary map visible to an occupant thereof, a linearform indicator movable over said map, the movement of a marked part of which gives the direction, while the position of said part identifies the place on the map where the vehicle is located, electrical means for moving said indicator as the vehicle moves and in which the speed of movement of said indicator is determined by the current through said electrical means, a hollow enclosure mountable on said vehicle a variable resistor in said enclosure, a lead connecting one end portion of said resistor to one side of said electrical means, the other end portion being insulated, a contact in said enclosed electrically connected to the other side of said electrical means and movably engageable with said resistor, said contact assuming a reference position relative to said vehicle, a shaft tranverse to and on which said enclosure hangs, a biasing weight connected to said shaft for normally positioning said enclosure in a normal position, and means responsive to the vehicle movement for pivoting said enclosure from said normal position, through an angle determined by the speed of the vehicle, whereby to vary the part of said resistor between said contact and the lead-connected portion and the speed of movement of said indicator over said map.

2. A direction and position indicator as recited in claim 1, the contact being a globule of conductive liquid.

3. A direction and position indicator as recited in claim 1, a transparent tube secured to the map along a route indicated thereon and which is to be traveled by the vehicle and the indicator is disposed in said tube.

4. A direction and position indicator as recited in claim 1, a housing mounted on the exterior of said vehicle, the front wall of said housing having apertures for receiving air under pressure generated by movement of the vehicle, said shaft being journalled in said housing, and the biasing weight is a control blade secured at its top edge to said shaft swingable therewith in said housing under the influence of said air.

5. A direction and position indicator as recited in claim 1, a rigid housing holds the map in place and the electrical means includes a motor also in said housing.

6. A direction and position indicator as recited in claim 7, a shaft driven by said motor, an axially-separable clutch between said motor and shaft, and said indicator is driven from said motor by engagement with said shaft.

7. A direction and position indicator as recited in claim 8, a knob on the outer end of said motor driven shaft for manually adjusting the position of said indicator and the coupling or uncoupling the shaft from the motor, and a latch device engageable with the motor driven shaft to prevent undesired axial movement thereof.

8. A direction and position indicator for a motorized vehicle comprising a stationary map visible to an occupant of the vehicle, a linearform indicator movable over said map, the movement of a marked part of said indicator giving the direction, while the position of said part identifies the place on the map representing where the vehicle is located, an electric battery carried on the vehicle, an electric motor powered by said battery and adapted to move said part at a speed determined by that of said vehicle, in different directions as the vehicle turns, whereby to indicate on said map the movement as well as the direction of travel of the vehicle, a current-controlling device in a housing mounted on the exterior of said vehicle so as to be operated by moving air pressure generated as the vehicle moves, the front wall of said housing having apertures for receiving such air under pressure, the current from the battery to the motor being varied by passing through said device, said current-controlling device including a transverse shaft journalled in said housing, a control blade secured at its top edge to said shaft and swingable therewith in said housing, a variable resistor assembly carried on a portion of said shaft outside said housing and including a hollow enclosure with a cylindrical outer portion lined by a conductive strip and an inner portion carrying a cylindrical insulator ring, a resistance element on said ring, a globule of conductive liquid on said strip, and engaging said element, thereby minimizing friction of resistor movement, and leads connecting the battery to one side of said motor and the other side of said motor to an end of said resistor assembly, whereby the speed of the motor is controlled by the speed of the vehicle through swinging of said blade by said air under pressure.

9. A direction and position indicator for a motorized vehicle comprising a stationary map visible to an occupant of the vehicle, a linearform indicator movable over said map, the movement of a marked part of said indicator giving the direction while the position of said part identifies the place on the map where the vehicle is located, an electric battery, an electric motor powered by said battery, a rheostat in the motor circuit adjusted as the vehicle speed varies to cause the motor to move said marked part over said stationary part at a speed determined by that of said vehicle and in different directions as the vehicle turns, wherein to respectively indicate on said map the movement as well as the direction of travel of the vehicle, a rigid housing holding the map and the motor in place, a shaft driven by said motor, said indicator being driven from said motor by engagement with said shaft, an axially-separable clutch between said motor and shaft, a knob on the outer end of said shaft for manually adjusting the position of said indicator, and for coupling or uncoupling the shaft from the motor, and a latch device engageable with the shaft to prevent undesired axial movement thereof.

10. A direction and position indicator for a motorized vehicle comprising a stationary map visible to an occupant of the vehicle, a linearform indicator associated with said map, the movement along said map of a marked part of said indicator giving the direction, while the position of said part identifies the place on the map where the vehicle is located, a transparent tube secured to the map along a highway indicated thereon and which is to be traveled by the vehicle, the indicator being disposed in said tube, an electric battery carried on the vehicle, an electric motor powered by said battery, a housing mounted on the exterior of said vehicle, a current controlling device therein, the current from said battery to the motor being varied by passing through said device, the front wall of said housing being apertured for receiving air under pressure generated as the vehicle moves, said device comprising a transverse shaft journalled in said housing, a control blade secured at its top edge to said shaft and swingable therewith in said housing, said circuit-controlling device comprising a variable resistor assembly carried on a portion of said shaft outside said housing and through which passes current to the motor from the battery, said assembly comprising a hollow enclosure, a cylindrical portion of which is lined by a conductive strip and carries a cylindrical inner insulator ring, a resistance element on said ring, a globule of mercury disposed on said strip and engaging said element, leads connecting the battery to one side of said motor and the other side of said motor to the end of said resistance winding toward the front of said resistor assembly, so that the motor moves said marked part at a speed determined by that of said vehicle, in different directions as the vehicle turns, whereby to respectively indicate on said map the movement as well as the direction of travel of the vehicle, a rigid housing for said motor, spring clips thereof holding the map in place, a shaft driven by said motor, an axially-separable clutch between said motor and shaft, said indicator being connected to said shaft by being wound therearound, a knob on the outer end of said motor-driven shaft for manually adjusting both the position of said indicator and said clutch to couple or uncouple the shaft from the motor, a peripheral groove in the shaft and a latch device engageable therein to prevent undesired axial movement thereof, whereby the speed of the motor is controlled by the speed of the vehicle through adjustment of said current-controlling device upon swinging of said blade by said air under pressure.

References Cited

UNITED STATES PATENTS

| | | | |
|---|---|---|---|
| 1,077,596 | 11/1913 | Clark | 40—41 |
| 1,162,366 | 11/1915 | Jensen | 73—186 |
| 1,342,594 | 6/1920 | Parkin | 338—151 |
| 1,572,447 | 2/1926 | Schroeder | 40—41 X |
| 1,819,849 | 8/1931 | Stearns | 338—151 X |
| 1,998,535 | 4/1935 | Dicks | 40—42 |
| 2,388,248 | 11/1945 | Bidwell | 338—151 X |

LOUIS R. PRINCE, Primary Examiner

DANIEL M. YASICH, Assistant Examiner

U.S. Cl. X.R.

40—37; 73—186; 116—124